United States Patent [19]
Ferguson, Sr.

[11] Patent Number: 5,341,828
[45] Date of Patent: Aug. 30, 1994

[54] TRUCK TIRE WASHING

[76] Inventor: John H. Ferguson, Sr., P.O. Box 116, Linwood, N.C. 27299

[21] Appl. No.: 13,959

[22] Filed: Feb. 5, 1993

[51] Int. Cl.$^5$ .................................................. B08B 3/02
[52] U.S. Cl. ............................... 134/123; 134/172; 134/181; 239/752
[58] Field of Search ............... 134/45, 123, 172, 181; 239/752

[56] References Cited

U.S. PATENT DOCUMENTS

| | | |
|---|---|---|
| 3,342,191 | 9/1967 | Haines . |
| 3,446,217 | 5/1969 | Collier . |
| 3,903,559 | 9/1975 | Kuster et al. ......................... 134/45 |
| 3,996,948 | 12/1976 | Wiley ................................... 134/45 |
| 4,830,033 | 5/1989 | Hanna . |
| 4,917,125 | 4/1990 | Midkiff . |
| 4,971,084 | 11/1990 | Smith . |
| 4,972,862 | 11/1990 | Belanger . |
| 4,979,536 | 12/1990 | Midkiff . |
| 5,052,629 | 10/1991 | Belanger . |

FOREIGN PATENT DOCUMENTS

| | | | |
|---|---|---|---|
| 41087 | 12/1981 | European Pat. Off. ............. | 134/123 |
| 2117147 | 10/1972 | Fed. Rep. of Germany ...... | 134/123 |
| 2642959 | 3/1978 | Fed. Rep. of Germany ...... | 134/123 |
| 2828334 | 1/1980 | Fed. Rep. of Germany ...... | 134/123 |
| 52-44071 | 4/1977 | Japan ................................... | 134/123 |
| 57-74252 | 5/1982 | Japan ................................... | 134/123 |
| 57-172858 | 10/1982 | Japan ................................... | 134/123 |
| 62-6854 | 1/1987 | Japan ................................... | 134/123 |
| 1131481 | 10/1968 | United Kingdom ................ | 134/123 |

Primary Examiner—Frankie L. Stinson
Attorney, Agent, or Firm—Rhodes, Coats & Bennett

[57] ABSTRACT

An apparatus for washing tires mounted on a vehicle includes a vehicle supporting frame to support a vehicle as it passes over the frame. Right and left frame portions support right-side and left-side tires on the vehicle. A plurality of nozzles connected to a pressurized supply of a cleaning liquid are oriented to direct pressurized cleaning liquid toward the tires of the vehicle as the vehicle passes over the frame. The plurality includes upwardly- and forwardly-directed nozzles to direct cleaning liquid upward at a tread faces of the tires, respectively as the vehicle passes over the frame, and mounted in the frame for reciprocation fore-and-aft in the direction of motion of the vehicle. Inner and outer laterally- and forwardly-directed nozzles are mounted inwardly and outwardly of the left and right tires, respectively, for reciprocation fore-and-aft in the direction of motion of the vehicle as the vehicle passes over the frame. Final rinse nozzles are provided downstream of the upwardly directed nozzles and the laterally-directed nozzles in the direction of motion of the vehicle.

23 Claims, 2 Drawing Sheets

TRUCK TIRE WASHING

BACKGROUND OF THE INVENTION

The present invention relates to improvements in devices for washing tires of vehicles, particularly trucks.

Trucks and other vehicles which pass over muddy terrain often have mud adhered to their tires. Trucks which haul refuse to landfills or supplies to building sites often encounter this problem. In fact, many municipalities have enacted ordinances requiring trucks leaving such sites to have mud removed from their tires before entering streets and highways. Prior efforts to address this problem are shown in U.S. Pat. Nos. 4,979,536 and 4,917,125 to Midkiff.

However, those designs do not provide the only approach to removal of mud and other debris from tires and, in fact, lower cost alternatives are desirable. Furthermore, it is particularly difficult to remove mud which is adhered between adjacent dual tires. This mud is particularly difficult to remove, and the need continues in the art for an apparatus to remove all of the mud, including the mud between the dual wheels. In this application, the word "debris" will be used to refer to mud, primarily, but also any other dirt, trash or foreign matter which is removably adhered to the tires.

SUMMARY OF THE INVENTION

The present invention fulfills this need in the art by providing an apparatus for washing tires mounted on a vehicle, the tires having tread faces and side walls. A vehicle supporting frame supports a vehicle as it passes over the frame and a plurality of nozzles connected to a pressurized supply of a cleaning liquid are oriented to direct pressurized cleaning liquid toward the tires of the vehicle as the vehicle passes over the frame. The plurality includes at least one upwardly directed nozzle adapted to direct cleaning liquid upward at a tread face of a tire as the vehicle passes over the frame and mounted in the frame for movement in the direction of motion of the vehicle as the vehicle passes over the frame, with a drive attached to the upwardly directed nozzle to move the upwardly directed nozzle in the direction of motion of the vehicle.

Preferably, the upwardly directed nozzle is also forwardly directed in the direction of motion of the vehicle as the vehicle passes over the frame. The drive of the upwardly directed nozzle is preferably a reciprocation at a speed sufficient to exceed the speed of the vehicle in the forward direction, to strip caked-on debris from the tires.

Typically, the frame includes a right portion to support right-side tires on a vehicle and a left portion to support left-side tires on a vehicle, and the frame is a grate.

The plurality of nozzles may include a laterally directed nozzle mounted laterally of the sidewall of a tire as the vehicle passes over the frame for reciprocation fore-and-aft in the direction of motion of the vehicle as the vehicle passes over the frame and an oscillator may be provided attached to the laterally directed nozzle to oscillate the laterally directed nozzle fore-and-aft. An additional laterally directed nozzle may be directed toward an inner sidewall of the tire. A laterally directed nozzle may be directed toward an outer sidewall of the tire. Preferably, the laterally directed nozzle is also forwardly directed in the direction of motion of the vehicle as the vehicle passes over the frame.

The nozzles may include a final rinse nozzle downstream of the upwardly directed nozzles in the direction of motion of the vehicle, mounted for pivoting oscillation to spray cleaning liquid against outer sidewalls of the tires.

Preferably, the frame is located in a trough having a floor sloping to a drain to collect and direct cleaning liquid and removed debris to the drain.

The invention also provides a method of washing tires mounted on a vehicle, the tires having tread faces and side walls. The method includes passing a vehicle over a supporting frame, directing a pressurized supply of a cleaning liquid toward the tires of the vehicle as the vehicle passes over the frame, including directing at least a portion of the cleaning liquid through a nozzle upwardly at a tread face of a tire as the vehicle passes over the frame, and moving the nozzle in the direction of motion of the vehicle as the vehicle passes over the frame to strip debris from the tire.

Preferably, the upwardly directed portion is also forwardly directed in the direction of motion of the vehicle as the vehicle passes over the frame. Typically, the portion of the pressurized supply is directed upwardly through an opening in a grate. Desirably, the nozzle motion is reciprocation at a speed greater than the speed of the vehicle. Also desirably, portions of the pressurized supply are directed at right-side and left-side tires on a vehicle simultaneously.

The pressurized supply may include a portion directed toward a tire sidewall from a location lateral of the sidewall as the vehicle passes over the frame and reciprocating fore-and-aft in the direction of motion of the vehicle as the vehicle passes over the frame. This portion may be directed toward an inner sidewall of the tire or an outer sidewall of the tire. More preferably, portions are directed at both the inner and outer sidewalls. Typically, the portion is also forwardly directed in the direction of motion of the vehicle as the vehicle passes over the frame.

Preferably, the pressurized supply includes a portion downstream of the upwardly directed portion, defined in the direction of motion of the vehicle, and oscillating against outer sidewalls of the tires.

The method desirably includes collecting the portions of cleaning liquid and debris in a trough and directing the collected cleaning liquid to a drain.

BRIEF DESCRIPTION OF THE DRAWINGS

The invention will be better understood after a reading of the Detailed Description of the Preferred Embodiment along with a review of the drawings in which.

DETAILED DESCRIPTION OF THE PREFERRED EMBODIMENT

Figure 1:
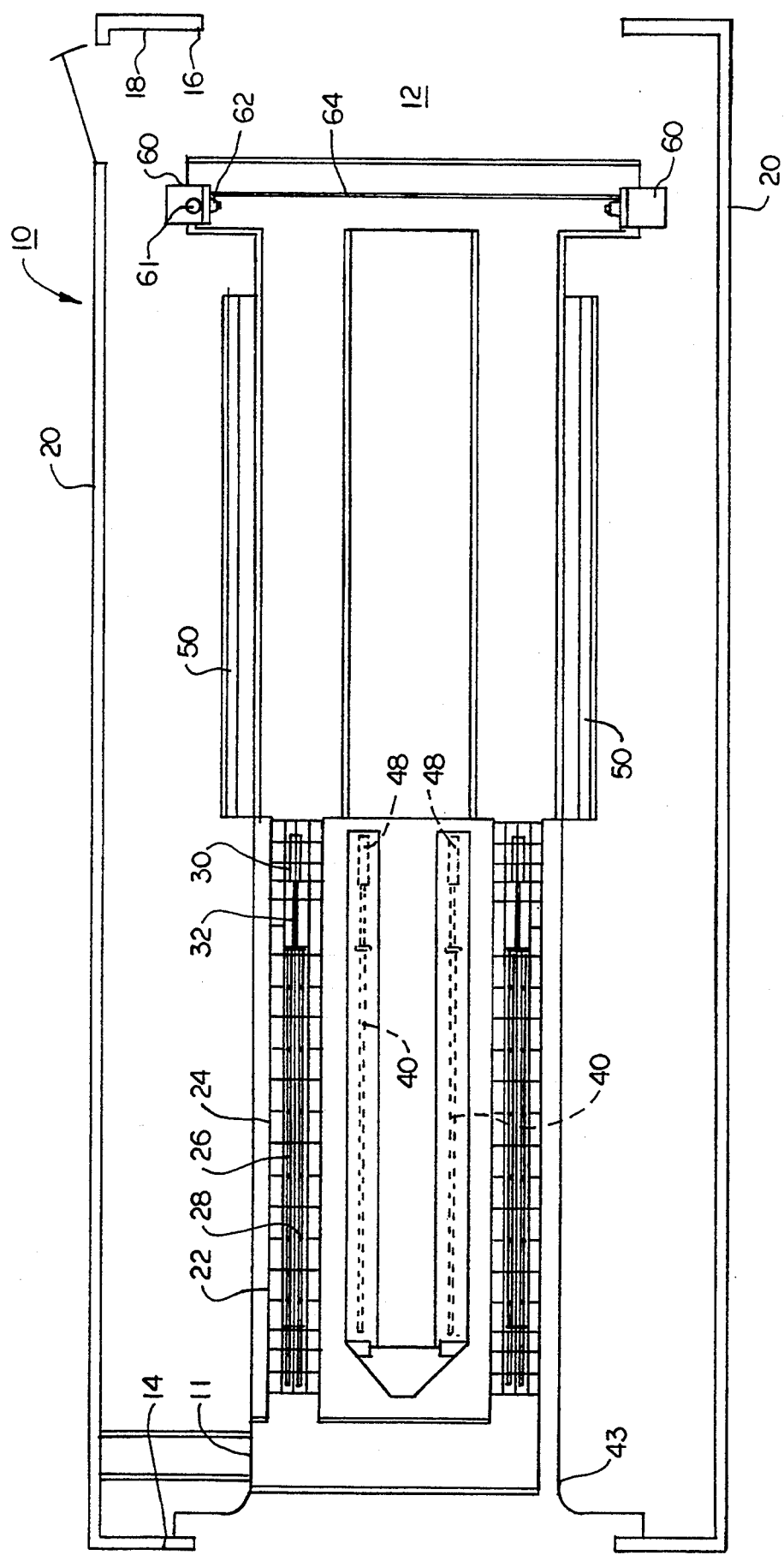
FIG. 1 is a plan view of a vehicle tire washing installation according to a preferred embodiment.

Referring now to FIG. 1, a plan view of installation according to a preferred embodiment, there is depicted an installation 10 in the form of a building through which a vehicle may be driven to wash to its tires. The building is not required, but is convenient to control spray runoffs. Other configurations may, of course, be implemented. The building includes a through-extending passageway 12 from an entrance end 14 to an exit end 16, with the building defined by walls 18,20. No roof is shown and is entirely optional.

Figure 4:
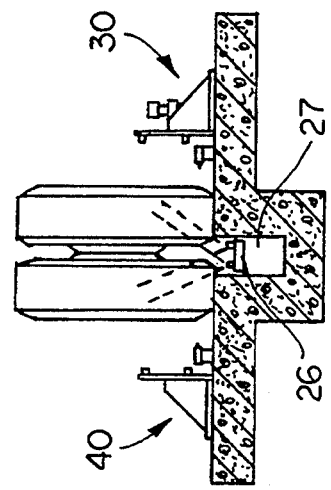
FIG. 4 is a sectional view taken along lines 4—4 in FIG. 2 and looking in the direction of the arrows.

Entrance end 14 opens to a washing assembly located between curbs 11,43, so that the washing assembly is lower than the curbs 11,43. Two identical grates 22 are provided of substantial construction, so as to support the weight of the vehicle being driven thereover. It should be appreciated that the vehicle may be quite heavy and laden, so that the supporting grates 22 should be configured to be quite sturdy. For example, half-inch thick steel plates 8-10" wide and sitting on edge are suitably used to form the grates, and rest on a concrete surface in a trough 27, as seen in FIG. 4.

Disposed within the grates are longitudinally extending manifolds 26 having an array of nozzles 28 thereon and mounted to direct a spray of cleaning liquid upwardly toward the tread surface of a vehicle driven over the grate 22. Water is the preferred cleaning fluid, but others could be used. While a clear water spray is typically sufficient, it will be appreciated that various soaps, detergents or the like could be added as desired. Preferably, a pair of manifolds 26 are provided in each grate 22, with each manifold having a plurality of nozzles 28 spaced along its length. The manifolds are mounted, supported in the grate 22, for reciprocation fore and aft, (that is, right and left in the view of FIG. 1), in crosswise extending grate members.

Bearings such as nylon block bearings are desirably provided to reduce friction. A cylinder 30 connected via linkage 32 to the manifolds is driven through a means, not shown, to cause the manifolds to oscillate. The cylinder 30 functions as an oscillator and may take various forms, including hydraulic or pneumatic cylinders, solenoids, motors with eccentrics, or the like. The speed of reciprocation is desirably such that a vehicle driven over the grate at a constant, low speed will repeatedly have its tires overtaken by the moving nozzles, so the reciprocation speed should be greater than the expected vehicle speed. If desired, a sign may be posted visible to a vehicle driver to dictate the speed at which the vehicle is to be driven, so as to assure the proper coordination of the nozzle movement with the tires. Alternatively, the vehicle speed can be measured and the oscillator driven at a higher speed, under an automatic control, as will be apparent to those of ordinary skill in the art.

Figure 2:
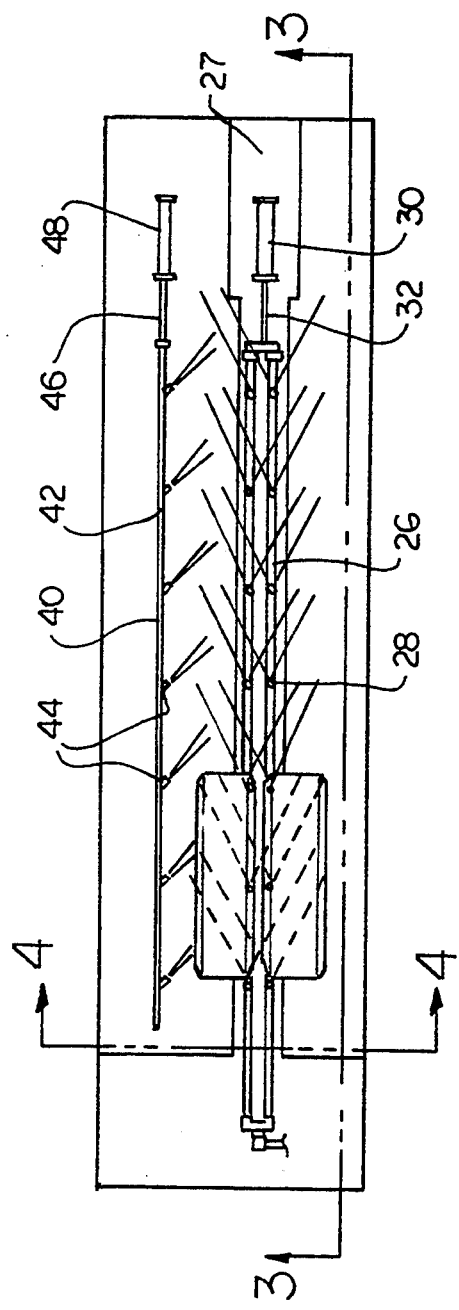
FIG. 2 is a an enlarged plan view of a portion of the installation of FIG. 1.

Disposed inwardly of the grates 22 are additional nozzle assemblies 40, better seen in FIG. 2. Preferably, the nozzle assemblies 40 are covered by a protective housing, so that items which might be dangling from the undercarriage of the vehicle do not damage the nozzles. The nozzle assembly 40 includes a manifold 42 with a plurality of spaced, outwardly- and forwardly-oriented nozzles 44. The manifold is, again, adapted for fore and aft oscillation, driven by an oscillator 48 linked via linkage 46 to the manifold 40. The oscillator 48 may be the same as or different from the oscillator 30. The manifolds 26 and 40 may, but need not, oscillate at the same frequency and phase. The objective of the nozzles 44 is simply to remove debris from the sidewalls of the tires, a considerably easier task than removing caked-on mud from between the sidewalls of the dual tires. Thus, the rate of reciprocation of the manifold 40 is not as critical as the reciprocation of the manifold 26.

Downstream, in the direction of travel of the vehicle of the grates 22 and spray assemblies 40, is an outer sidewall spray assembly 50 of virtually the same configuration as the inner sidewall spray assembly 40, except mounted on the curbs 11,43. These spray assemblies, of course, effect the washing of the outer sidewalls of the tires.

Finally, further downstream than the outer sidewall sprays 50 are final rinse sprays 60, on either side of the vehicle path. Each spray 60 is made up of several nozzles spraying toward the outer sidewalls, spaced along the height of the tires, and pivoting about axis 61. A linkage arm 64 may be provided to cause the two final rinse assemblies 60 on either side of the passageway 12 to reciprocate together, or to be commonly reciprocated by a single oscillator. The final rinse sprays are provided to assure that already-loosened debris is rinsed off the tires.

Also provided, as will be apparent to those of ordinary skill in the art and so therefore not shown in detail, are control assemblies and plumbing details. The oscillator manifolds may be supplied through flexible hoses so that the hose moves with the manifold as it oscillates. If desired, more elaborate and expensive supplies to the manifold through a stationary connection may be used. It is expected that a flow rate on the order of 230 gallons per minute at 300 psi will be an appropriate flow rate and pressure. The control system for the apparatus will typically be electrical. If desired, sensors may be provided to activate the system upon sensing the presence of a vehicle driving through the passageway 12, such as a traffic loop sensor buried within the passageway. Alternatively, a user-operable switch may be located to be activated by a vehicle driver or an attendant.

Figure 3:
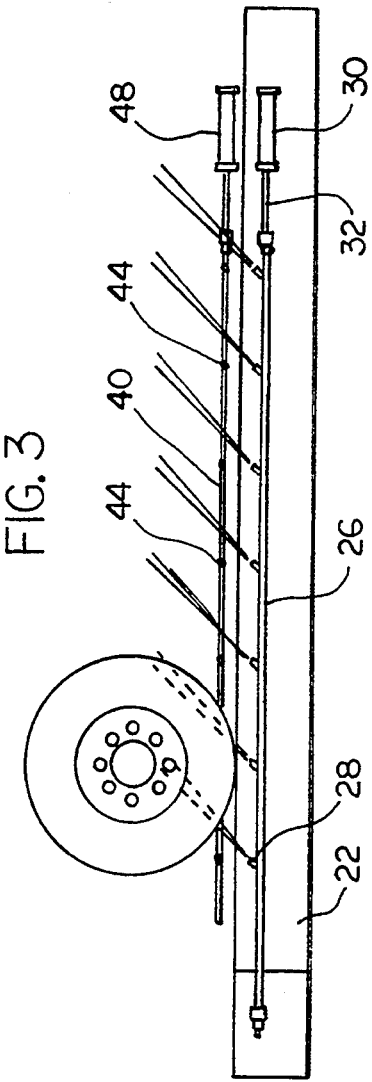
FIG. 3 is a sectional view taken along lines 3—3 of FIG. 2 and looking in the direction of the arrows.

As can be seen in FIGS. 2-4, the lower nozzles 28 are particularly effective to spray water up against the treads of the tires in a thorough pattern, caked-on mud can be effectively stripped from the tires, including from between the sidewalls of dual tires using nozzles configured as shown. The upward, forward, fan-shaped spray pattern directs pressurized water between the tires to dislodge and entrain the mud. By moving the nozzle faster than the tire surface, a "stripping" effect is obtained. That is, to the extent that the mud coheres, the dislodgement of a portion will expose the mud/tire interface and the tread-side face of the mud to the pressurized water to effect an action like the cutting away of the adhered mud ny the penetrating water spray. Also, as seen in FIG. 4, a trough 27 can be provided to collect the sprayed water and removed debris and directed to a low point in the passageway 12 for drainage.

Those of ordinary skill in the art will appreciate that various other modifications to the embodiment described herein may be made without falling outside the scope of the invention. Those modifications are deemed to be within the scope of the protected property. For example, the upwardly directed nozzle may be mounted on an endless chain so that the motion of the nozzle to strip the debris is effected without the return stroke of a cylinder.

What is claimed is:

1. An apparatus for washing tires mounted on a vehicle, the tires having tread faces and side walls, comprising a vehicle supporting frame to support a vehicle as it passes over said frame and a plurality of nozzles connected to a pressurized supply of a cleaning liquid and oriented to direct pressurized cleaning liquid toward the tires of the vehicle as the vehicle passes over said frame, said plurality including at least one upwardly directed nozzle adapted to direct cleaning liquid upward at a tread face of a tire as the vehicle passes over said frame and mounted in said frame for movement in the direction of motion of the vehicle as the vehicle passes over said frame, and a drive attached to said upwardly directed nozzle to drive said upwardly directed nozzle linearly in the direction of motion of the vehicle.

2. An apparatus as claimed in claim 1 wherein said upwardly directed nozzle is also forwardly directed in the direction of motion of the vehicle as the vehicle passes over said frame.

3. An apparatus as claimed in claim 1 wherein said frame includes a right portion to support right-side tires on a vehicle and a left portion to support left-side tires on a vehicle.

4. An apparatus as claimed in claim 1 wherein said frame is a grate.

5. An apparatus as claimed in claim 1 wherein said drive oscillates said upwardly directed nozzle fore-and-aft at a speed sufficient to have the speed of the nozzle's motion in the direction of the vehicle exceed the speed of the vehicle, to strip caked-on debris from the tire.

6. An apparatus as claimed in claim 1 wherein said plurality of nozzles includes a laterally directed nozzle mounted laterally of the sidewall of a tire as the vehicle passes over said frame for reciprocation fore-and-aft in the direction of motion of the vehicle as the vehicle passes over said frame and an oscillator is provided attached to said laterally directed nozzle to oscillate said laterally directed nozzle fore-and-aft.

7. An apparatus as claimed in claim 6 wherein said laterally directed nozzle is also forwardly directed in the direction of motion of the vehicle as the vehicle passes over said frame.

8. An apparatus as claimed in claim 1 wherein said frame is a grate having crosswise grate members and said upward directed nozzle is supplied with cleaning liquid through a manifold passing through a bearing in a crosswise grate member.

9. An apparatus as claimed in claim 1 wherein
said plurality of nozzles includes inner and outer laterally directed nozzles mounted inwardly and outwardly of a tire, respectively, for reciprocation fore-and-aft in the direction of motion of the vehicle as the vehicle passes over said frame,
an oscillator oscillates said inner and outer laterally directed nozzles fore-and-aft and
said inner and outer laterally directed nozzles are also directed toward the respective inner and outer sidewalls of the tire and forward in the direction of motion of the vehicle as the vehicle passes over said frame.

10. An apparatus as claimed in claim 1 wherein said nozzles include final rinse nozzles located downstream of said upwardly directed nozzles in the direction of motion of the vehicle and mounted for pivoting oscillation to spray cleaning liquid against outer sidewalls of the tires.

11. An apparatus as claimed in claim 1 wherein said frame is located in a trough having a floor sloping to a drain to collect and direct cleaning liquid to said drain.

12. An apparatus for washing tires mounted on a vehicle, the tires having tread faces and side walls comprising a vehicle supporting frame to support a vehicle as it passes over said frame including a right portion to support right-side tires on a vehicle and a left portion to support left-side tires on a vehicle, a plurality of nozzles connected to a pressurized supply of a cleaning liquid and oriented to direct pressurized cleaning liquid toward the tires of the vehicle as the vehicle passes over said frame, said plurality including right-side and left-side, upwardly-directed nozzles to direct cleaning liquid upward at a tread faces of right and left tires, respectively as the vehicle passes over said frame, said upwardly directed nozzles being also forwardly directed in the direction of motion of the vehicle as the vehicle passes over said frame and mounted in said frame for reciprocation fore-and-aft in the direction of motion of the vehicle as the vehicle passes over said frame, inner and outer laterally-directed nozzles mounted inwardly and outwardly of the left and right tires, respectively, for reciprocation fore-and-aft in the direction of motion of the vehicle as the vehicle passes over said frame, said inner and outer laterally-directed nozzles also being directed toward the respective inner and outer sidewalls of the tire and forward in the direction of motion of the vehicle as the vehicle passes over said frame, final rinse nozzles downstream of said upwardly directed nozzles and said laterally-directed nozzles in the direction of motion of the vehicle mounted for pivoting oscillation to spray cleaning liquid against outer sidewalls of the tires, and at least one oscillator attached to said upwardly-directed nozzles and said laterally directed nozzle to oscillate said nozzles fore-and-aft in the direction of motion of the vehicle.

13. A method of removing debris from tires mounted on a vehicle, the tires having tread faces and side walls comprising passing the vehicle over a supporting frame, directing a pressurized supply of a cleaning liquid toward the tires of the vehicle as the vehicle passes over the frame, including directing at least a portion of the cleaning liquid through a nozzle upwardly at a tread face of a tire as the vehicle passes over the frame, and moving the nozzle linearly in the direction of motion of the vehicle as the vehicle passes over the frame to strip debris from the tire.

14. A method as claimed in claim 13 wherein the upwardly directed portion is also forwardly directed in the direction of motion of the vehicle as the vehicle passes over the frame.

15. A method as claimed in claim 13 wherein said moving step comprises reciprocating the nozzle at a speed greater than the speed of the vehicle.

16. A method as claimed in claim 13 wherein said directing step includes directing portions of the pressurized supply are at right-side and left-side tires on a vehicle simultaneously.

17. A method as claimed in claim 13 wherein the portion of the pressurized supply is directed upwardly through an opening in a grate.

18. A method as claimed in claim 13 wherein the directing step includes directing a lateral portion of the pressurized supply toward a tire sidewall from a location lateral of the sidewall as the vehicle passes over the frame and reciprocating the lateral portion fore-and-aft in the direction of motion of the vehicle as the vehicle passes over the frame.

19. A method as claimed in claim 18 wherein the lateral portion is directed toward an inner sidewall of the tire.

20. A method as claimed in claim 18 wherein the lateral portion is directed toward an outer sidewall of the tire.

21. A method as claimed in claim 18 wherein the lateral portion is also forwardly directed in the direction of motion of the vehicle as the vehicle passes over the frame.

22. A method as claimed in claim 13 wherein the directing step includes directing a final rinse portion of the pressurized supply downstream of the upwardly directed portion, defined in the direction of motion of the vehicle, and oscillating the final rinse portion against outer sidewalls of the tires.

23. A method as claimed in claim 13 further comprising collecting the portions of cleaning liquid in a trough and directing the collected cleaning liquid to a drain.

* * * * *